United States Patent [19]

McHugh

[11] Patent Number: 6,068,720
[45] Date of Patent: May 30, 2000

[54] METHOD OF MANUFACTURING INSULATING GLASS UNITS

[75] Inventor: Michael P. McHugh, Solon, Ohio

[73] Assignee: Edge Seal Technologies, Inc., Bedford, Ohio

[21] Appl. No.: 09/109,026

[22] Filed: Jul. 1, 1998

[51] Int. Cl.[7] .................................................. C03C 27/00
[52] U.S. Cl. .................................. 156/109; 141/1; 141/4; 141/66; 432/77; 432/82; 432/85
[58] Field of Search .................................... 156/107, 109; 141/1, 4, 8, 66; 432/77, 82, 85

[56] References Cited

U.S. PATENT DOCUMENTS

| | | | |
|---|---|---|---|
| 4,886,095 | 12/1989 | Lisec | 141/4 |
| 5,017,252 | 5/1991 | Aldrich et al. | 156/109 |
| 5,110,337 | 5/1992 | Lisec | 65/58 |
| 5,254,152 | 10/1993 | Vehmas | 65/348 |
| 5,413,156 | 5/1995 | Lisec | 141/165 |
| 5,419,799 | 5/1995 | Lind et al. | 156/381 |

*Primary Examiner*—Francis Lorin
*Attorney, Agent, or Firm*—Watts Hoffmann Fisher & Heinke

[57] ABSTRACT

A method of manufacturing insulating glass units is disclosed that comprises delivering a succession of high temperature insulating glass units from an oven and a press, moving successive IGUs along a travel path with the major surfaces of each IGU extending substantially parallel to the major surfaces of adjacent IGUs, establishing an IGU cooling station on the travel path, moving the IGUs into heat exchange relationship with a fluent cooling medium at the cooling station to reduce the IGU temperature, and thereafter closing and sealing a vent opening of each IGU. Successive IGUs are moved along the travel path with their major surfaces disposed in substantially vertical planes and successive IGUs disposed in closely spaced relation. The cooling station comprises at least a blower for directing cooling medium onto IGUs moving through the cooling station. The blower directs cooling medium onto the IGUs in a direction parallel to the major surfaces. An inert gas source is connected to the IGU by a flexible hose and hose support that enable the IGU to fill with inert gas while being conveyed to the closure and sealing station. The vent port is closed and sealed as the IGU is being conveyed away from the cooling station. The vertical orientation of the IGUs while being conveyed, makes it quicker and easier to perform the sealing operation.

9 Claims, 5 Drawing Sheets

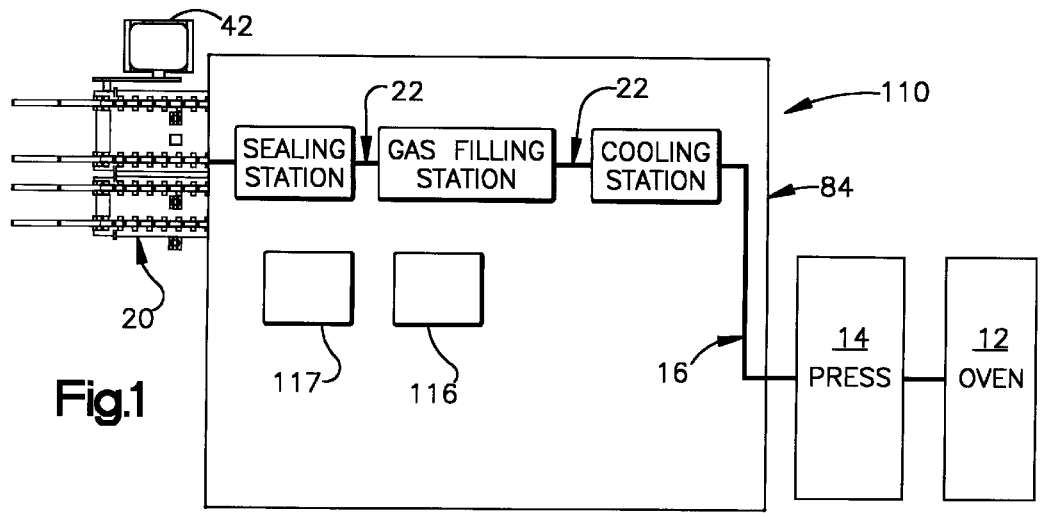
Fig.1
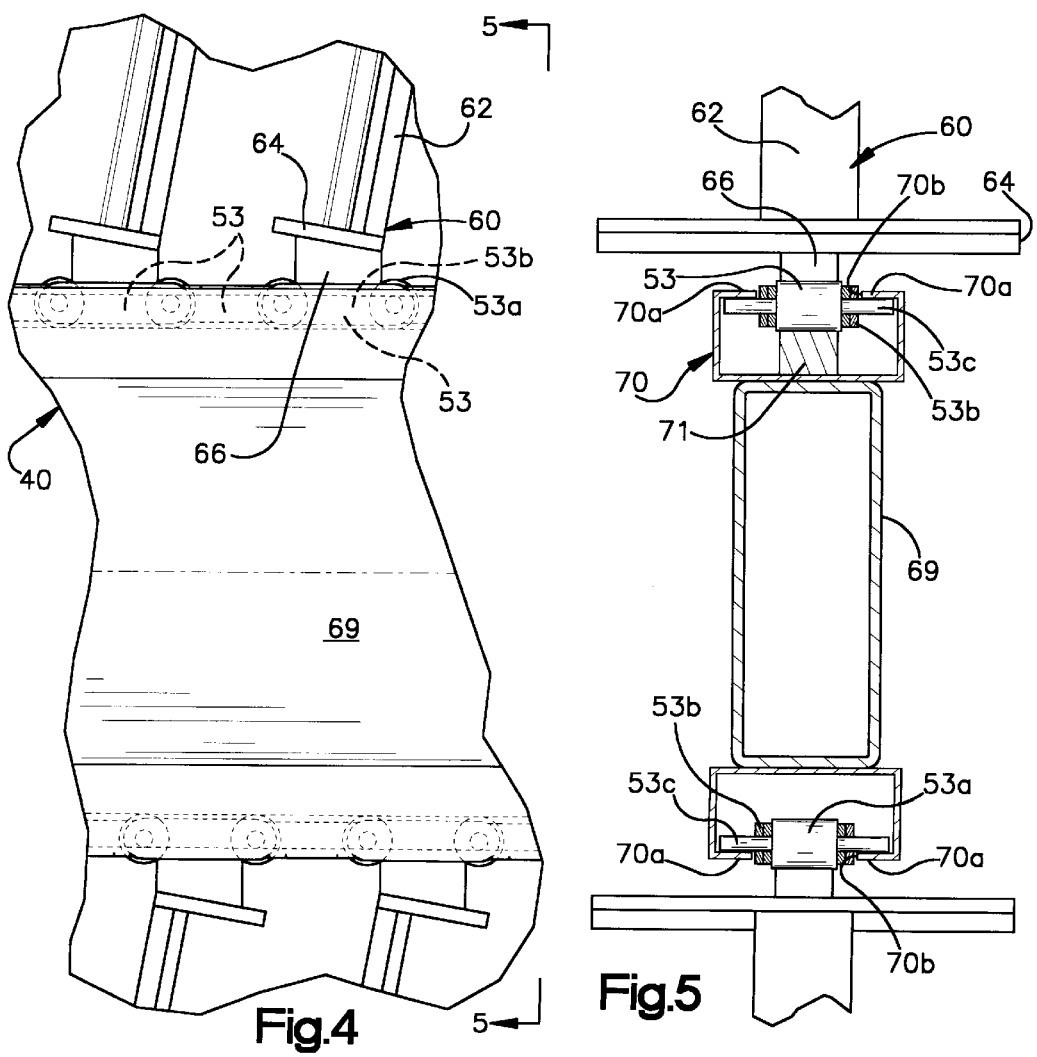
Fig.4
Fig.5

METHOD OF MANUFACTURING INSULATING GLASS UNITS

The present invention relates to manufacturing insulating glass units and more particularly to a manufacturing method wherein insulating glass units are discharged from an oven and press, cooled and readied for shipment or further assembly in a minimal amount of time.

BACKGROUND OF THE INVENTION

Manufacturing insulating glass units (IGUs) typically involves applying a heat activated sealant material to a spacer frame, sandwiching the spacer frame and sealant between glass lites, and passing the assemblage through an oven and a roller press. The sealant is heated in the oven and the roller press forces the lites and heated sealant together so the IGU has a predetermined thickness and the glass and sealant are hermetically joined.

Typical ovens run at about 800 F°. The IGUs are conveyed slowly through the oven so that the sealant material is heated sufficiently to flow and form a hermetic bond with the glass lites. At the same time the remaining IGU components are heated significantly above room temperature.

In the past, IGUs delivered from the roller press were stacked and allowed to cool for a substantial period of time—often hours. After cooling, an open vent port, which extended through the spacer frame between the ambient air and the IGU interior, was closed and sealed in a separate operation. Typically, a rivet was installed in the port, after which a sealant material was applied to the IGU edge to seal any leakage paths around the rivet.

When so called "low emissivity" IGUs were produced, the cooled IGUs were filled with Argon, or other suitable inert gas, before the vent port was closed and sealed.

Cooling IGUs is a necessary step in their manufacture. If the vent port is closed and sealed before the IGU has cooled, the air or gas sealed in the dead air space cools along with the IGU. As the entrapped air or gas cools, its pressure is reduced below atmospheric pressure. Consequently, the glass lites are bowed inwardly towards each other by the atmospheric pressure exerted on them. The result is an unacceptable IGU.

The necessity of cooling the IGUs resulted in a serious manufacturing bottleneck. Production machinery was capable of fabricating significant numbers of partially completed IGUs in a short period of time. But the IGUs then had to be stacked and permitted to sit idle for substantial periods of time as they cooled to ambient temperature. Furthermore, the subsequent steps of closing and sealing the vent ports—and introducing inert gas when required—were essentially manual operations that have been difficult and time consuming to complete.

The present invention provides a new and improved method of manufacturing IGUs wherein individual IGUs emerging from an oven and press are rapidly cooled and hermetically sealed while being conveyed to a location where the completed IGUs may be assembled into a window or other frame or prepared for shipment to a remote assembly location.

SUMMARY OF THE INVENTION

According to a preferred embodiment of the invention the new method of manufacturing insulating glass units comprises delivering a succession of high temperature insulating glass units from an oven and a press, moving successive IGUs along a travel path with the major surfaces of each IGU extending substantially parallel to the major surfaces of adjacent IGUs, establishing an IGU cooling station on the travel path, moving the IGUs into heat exchange relationship with a fluent cooling medium at the cooling station to reduce the IGU temperature, and thereafter closing and sealing the vent opening of each IGU.

Preferably successive IGUs are moved along the travel path with their major surfaces disposed in substantially vertical planes and successive IGUs disposed in closely spaced relation.

In the illustrated and preferred embodiment of the invention the cooling station comprises at least a blower for directing cooling medium onto IGUs moving through the cooling station. Preferably the blower directs cooling medium onto the IGUs in a direction parallel to the major surfaces.

In the preferred IGU fabricating method, the vent port is closed and sealed as the IGU is being conveyed away from the cooling station. The vertical orientation of the IGUs while being conveyed, makes it quicker and easier to perform the sealing operation.

Where an inert gas is flowed into the IGU, the inert gas source is connected to the IGU by a flexible hose that enables the IGU to fill with inert gas while being conveyed to the closure and sealing station.

Additional features and advantages of the invention will become apparent from the following detailed description of a preferred embodiment made with reference to the accompanying drawings which form part of the specification.

BRIEF DESCRIPTION OF THE DRAWINGS

FIG. 1 is a diagrammatic top plan view of a production line for practicing a method of manufacturing IGUs embodying the present invention;

FIG. 4 is a view seen approximately from the plane indicated by the line 4—4 in FIG. 2;

FIG. 5 is a view seen approximately from the plane indicated by the line 5—5 in FIG. 4;

DESCRIPTION OF THE BEST MODE CONTEMPLATED FOR PRACTICING THE INVENTION

Figure 2:
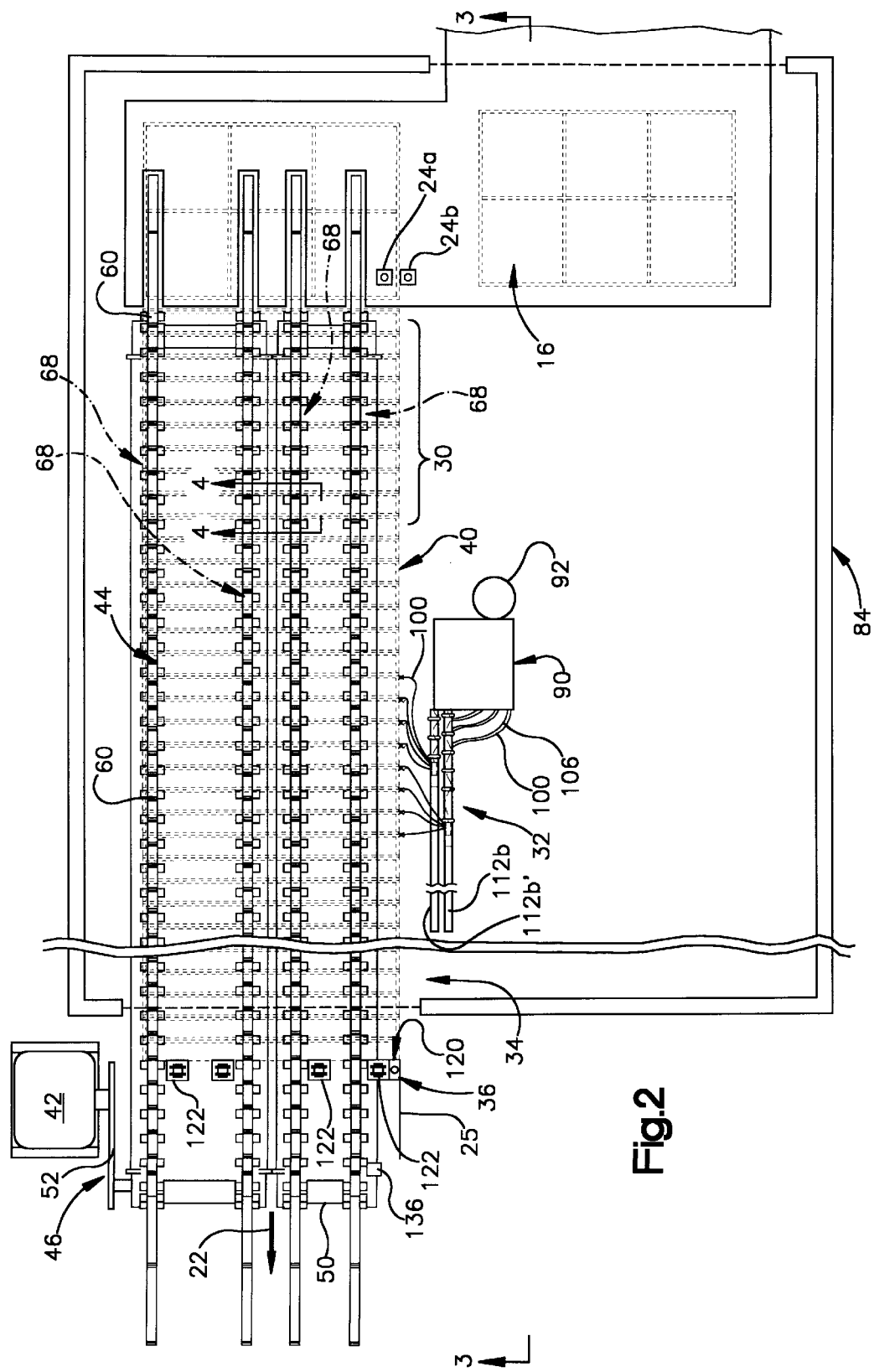
FIG. 2 is a top plan view of part of the production line of FIG. 1 with parts illustrated schematically.

FIG. 1 of the drawings diagrammatically shows part of an insulating glass unit (IGU) production line 10 comprising an oven 12, a press 14, a conveyor 16 for delivering IGUs serially from the press, a condensing conveyor 20 receiving IGUs from the delivery conveyor 16 and transporting them in closely spaced relation along a travel path 22 that extends through a cooling station 30, a gas filling station 32, and a sealing station 34. The completed IGUs are then delivered to an off-loading station 36. Production line attendants access the stations 30, 32, 34, 36 from the "front" side of the conveyor 20.

The IGUs may be of any suitable or conventional construction. For the purposes of description, each is formed by a metal spacer frame that is coated on opposite sides with a hot melt adhesive material and sandwiched between sheets of glass. The periphery of the spacer frame is coated with hot melt adhesive as well, except for a short uncoated space near one corner of the IGU where a vent opening, formed in the spacer frame, communicates the IGU interior with ambient atmosphere. The IGUs are conveyed serially through the oven 12 where the hot melt material is heated substantially above ambient temperature—with the spacer frame and glass being heated as well—so that the hot melt is heat softened. The heated IGUs advance serially to the press 14 where they pass between rollers that flow the softened hot melt and reduce the overall IGU thickness to a predetermined dimension. At the same time the glass and hot melt are bonded together and the junctures of the glass, hot melt, and frame are sealed. The delivery conveyor 16 advances the IGUs one at a time from the press 14 to the condensing conveyor 20. The oven 12 and press 14 are of conventional construction and therefore are not described in further detail. In the preferred embodiment of the invention the IGUs move through the oven and press in horizontal orientations. As the IGUs pass from the press 14 a particulate lubricating material may be deposited on them to aid in subsequent handling and stacking.

The delivery conveyor 16 includes an "L" shaped end section (viewed in plan) where IGUs are fed to be picked up by the conveyor 20. A production line attendant standing at the juncture of the conveyors 16, 20 manipulates the IGUs so that the vent opening of each IGU is located at the IGU trailing edge and adjacent the IGU corner remote from the conveyor 20. The attendant feeds each IGU to a position where the trailing edge lies in a plane 25 that extends parallel to the travel path along the "front" side of conveyor 20. A pair of sensors 24a, 24b senses the trailing edge of the IGUs that are fed to the conveyor 20 and enables operation of the conveyor 20 to pick up the properly positioned IGU. The preferred sensors 24a, 24b are conventional photo responsive devices connected to switching circuitry that enables and disables the conveyor 20; however the sensors and circuitry may be of any conventional or suitable construction and are therefore not illustrated or described in further detail.

The condensing conveyor 20 removes individual IGUs from the delivery conveyor 16 so that successive IGUs on the conveyor 20 are spaced closely together with adjacent major surfaces confronting each other, but not in contact and the edges of the IGUs "justified" along the plane 25 at the front side on the conveyor 20. A continuous train of IGUs moving from the delivery conveyor 16 can thus be condensed, or compacted, by the conveyor 20 so that many IGUs may be transported on a relatively short length of the conveyor 20. The conveyor 20 operates at a much lower lineal speed than the conveyor 16 while delivering the same IGU through-put. The preferred conveyor 20 comprises a supporting framework 40, a drive motor 42, an endless conveyor unit 44, and a transmission 46 between the motor 42 and the conveyor unit 44.

The illustrated framework 40 is formed by welding steel structural members together for supporting the conveyor unit 44 with its upper reach on the travel path 22. The illustrated framework extends horizontally from the delivery conveyor along the travel path 22 past the stations 30, 32, 34, and 36. In the preferred embodiment the framework comprises parallel longitudinally extending side frame members supported by vertical legs and secured together by a series of lateral frame elements extending between the side frame members and between the upper and lower reaches of the conveyor unit.

The motor 42 is preferably an electric motor that is mounted on the framework 40 beneath and to the rear side of the conveyor unit. The transmission 46 comprises a shaft 50 that supports and drives the conveyor unit, and a drive chain 51 between the motor 42 and the shaft 50. The shaft 50 carries driving sprockets by which the shaft is driven from the chain drive. The shaft 50 also carries sprocket-like elements by which the shaft 50 is linked to the conveyor unit 44 for driving it. The shaft 50 extends laterally across the framework end remote from the delivery conveyor 16 and is supported by bearings mounted on the framework end. A second, idler shaft 52 (FIG. 3) supports the conveyor unit 44 remote from the shaft 50 at the framework end adjacent the delivery conveyor 16. The shaft 52 is journaled in bearings mounted on the framework end.

The illustrated conveyor unit 44 is so constructed and arranged that it is capable of picking individual IGUs from the delivery conveyor 16 and shifting each IGU from its horizontal orientation on the delivery conveyor to a generally vertical orientation where it is closely adjacent both the preceding and succeeding IGUs. The illustrated conveyor unit 44 comprises four parallel roller chains, each formed by lug-like links 53 (see FIGS. 4 and 5). The conveyor chains are reaved around respective sprocket wheels on the shafts 50, 52 at the opposite longitudinal framework ends. The chain links 53 are relatively large with alternate links connected to an IGU carrier assembly 60.

Figure 3:
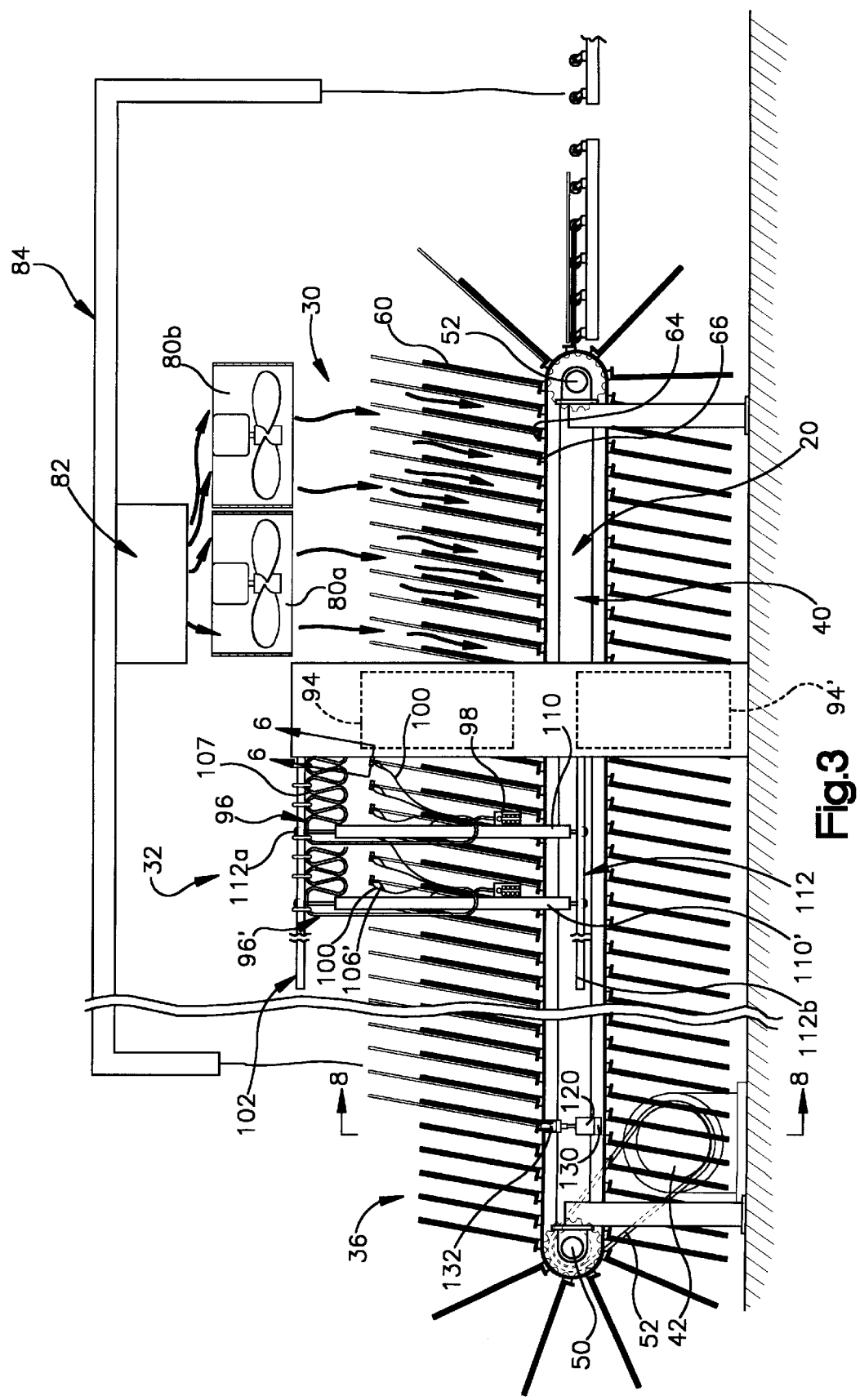
FIG. 3 is a view seen approximately from the plane indicated by the line 3—3 in FIG. 2.

The IGU carrier assemblies 60 are illustrated as arrayed across the travel path in closely spaced groups of four so that IGUs of various dimensions can be moved through the stations in closely spaced, nearly vertical orientations. As best seen in FIGS. 3–5 each IGU carrier assembly comprises an IGU supporting mast 62, an IGU edge supporting plate 64, and a shoe 66 connecting the mast and plate to the supporting conveyor unit chain link. The sprockets and the conveyor unit chain links are aligned laterally across the travel path 22 so that each IGU is supported by aligned carrier assemblies 60 at a right angle with respect to the travel path.

Each illustrated mast 62 is formed by a straight steel channel-like member that projects transversely from the travel path for supporting an IGU along one major face. The plate 64 is a rectangular member that is fixed with respect to the mast at its base in a plane that is perpendicular to the mast. The mast and plate carry a sheet-like relatively soft plastic facing material that engages and supports the IGUs without causing damage. The shoe 66 is fixed to the conveyor chain link 53 and the mast and plate are welded, or otherwise rigidly affixed, to the shoe. In the illustrated and preferred embodiment the mast projects from the shoe at a slight angle from normal so that the carried IGU leans slightly as it moves along the travel path.

In the preferred embodiment of the invention the chain links 53 are comprised of rollers 53a, link bodies 53b, and roller axles 53c (FIGS. 4 and 5). The roller axles are formed by cylindrical pins that rotatably support the rollers and project axially beyond each roller end through and beyond the adjacent link bodies to connect the links 53 together. The links 53 may be of any suitable commercially available type and are illustrated schematically.

Parallel chain guide assemblies 68 extend along the travel path 22 between the shafts 50, 52 and between the upper and lower reaches of the chain. The chain guides form trackways for supporting the shoes 66 as they move along both the upper and lower chain reaches. The chain guide assemblies thus prevent both chain reaches from sagging between the shafts 50, 52. The chain guide assemblies are supported by the lateral frame elements.

The chain links 53 and chain guide assemblies 68 are constructed so that the shoes 66 move along the chain guide assemblies with minimal frictional resistance and noise. In the illustrated conveyor, each chain guide assembly comprises a plurality of supporting beams 69, guide channels 70, and a roller track 71 for the chain rollers moving along the upper conveyor reach (see FIGS. 4 and 5). The supporting beams 69 are axially aligned and extend longitudinally along the travel path 22 between adjacent lateral support elements of the framework. Each guide channel 70 is formed by an elongated channel mounted on a supporting beam 69 with its open side facing away from the beam. The channel includes longitudinal flanges 70*a* that extend toward each other to provide an open slot 70*b* extending the length of the channel. The channels 70 of each guide assembly extend from adjacent the sprocket at one end of the conveyor to adjacent the sprocket at the other end. The roller track 71 extends throughout the length of the channels on the upper sides of the supporting beams 69.

The chain links 53 are received in the channels. The rollers and link bodies are sufficiently narrow to pass freely through the slot 70*b*. The roller axles 53*c* are disposed inside the channels and extend nearly completely across the space between the opposite lateral channel walls. The rollers are aligned with and engage the roller track 71 while the axles 53*c* maintain the rollers and roller track aligned as the links move along the travel path. The chain rollers and roller track support the weight of the conveyor chain and the IGUs being conveyed along the travel path. Chain links 53 on the lower chain reach extend within the lower reach channels and are held in place by the roller axles, which engage the inner surfaces of the channel flanges 70*a* so that the lower chain reach does not sag away from the framework 40.

As a conveyor chain link 53 rounds the shaft 52 it moves from the lower reach to the upper reach and reverses its direction of travel (see FIG. 3). The masts 62 of the associated assemblies 60 experience an angular acceleration away from the masts of the next succeeding group of assemblies 60 on the lower reach. Accordingly, at the delivery conveyor end of the conveyor unit 44 the masts of successive groups are separated substantially, facilitating the entry of an IGU between successive masts. When an IGU is in position to be picked up by a group of masts, the motor 42 may operate to advance the conveyor so that the masts pass between delivery conveyor rollers, engaging and lifting the IGU from the delivery conveyor as the masts move toward the upper reach. In the preferred embodiment of the invention the position sensors can be manually overridden by the production line attendant to continue operating the conveyor unit 44 without an IGU being delivered from the delivery conveyor.

When the carrier assemblies and IGU arrive at the upper reach, the IGU and carrier assemblies are disposed immediately adjacent the preceding carrier assemblies and their supported IGU (if an IGU is being supported there). The IGUs extend upwardly from the travel path at a slight angle from vertical. The IGUs move slowly and intermittently along the travel path 22 into the cooling station 30. The preferred conveyor unit moves the IGUs at a rate of about 0.3–0.7 meters per minute.

At the cooling station the IGUs move into heat exchange relationship with a fluent cooling medium to rapidly reduce the IGU temperature. The preferred and illustrated cooling station 30 comprises first and second blowers 80*a*, 80*b* for directing high velocity airstreams across the IGU faces, and a chiller unit 82. The blowers 80 are illustrated as arranged in tandem along the travel path 22. The blowers are preferably supported by a suitable framework above the IGUs for directing air-blasts downwardly across and between the IGUs at the cooling station. The preferred blowers 80 are shrouded axial flow fans driven by electric motors. The blowers 80*a*, 80*b* are located adjacent and just below the chiller unit. The blowers induce flows of air across the chiller and direct that air onto the IGUs to accelerate the cooling process. The chiller may be of any suitable or conventional construction, but in the illustrated embodiment of the invention it is formed by the evaporator coil of a conventional vapor compression refrigeration system that is mounted at the cooling station 30 over the blowers. The remaining refrigeration system components are located remote from the station 30 and are not illustrated. The IGUs emerge from the cooling station 30 substantially at ambient temperature and in condition for being sealed closed.

In the preferred embodiment of the invention the cooling station 30, filling station 32, and sealing station 34 are all located within a room-like enclosure 84. The enclosure has four walls and a ceiling. Its floor is formed by the floor of the factory where the production line 10 is situated. The chiller unit 82 and the blowers 80 are supported by the ceiling. The conveyor 44 extends through the enclosure with one end projecting from the enclosure to the off-loading station 36. The enclosure 84 serves to minimize heat transfer from the surrounding factory to the chilled air ambient the IGUs being cooled down. Openings in opposite enclosure walls permit the IGUs to pass into and from the enclosure. The openings are provided with heat insulating curtains formed by hanging strips of plastic material that cover the opening to minimize ingress of heated air into the enclosure while permitting the IGUs to pass through.

The preferred and illustrated embodiment of the invention is constructed and arranged for producing low emissivity, or "low E," IGUs by enabling the introduction of gaseous Argon, or equivalent, into the IGUs as they proceed along the travel path. In the illustrated production line 10 a gas supply system 90 is provided at the station 32 for filling the IGUs with Argon. The supply system 90 comprises a source of compressed gas 92, metering units 94, 94' for controlling the flow of gas from the source 92 to the IGUs, and delivery systems 96, 96' by which the gas is introduced into IGUs moving along the travel path. In the illustrated and preferred embodiment of the invention the IGUs are oriented so that their vent openings are located on the IGU side facing the supply system 90 and adjacent the upper corner of the IGU. Argon gas flowing to the IGUs enters through each vent opening and, since the Argon is heavier than air, displaces the air in the IGU. The displaced air flows out of the vent opening. The flow rate of Argon is maintained relatively low to minimize turbulence and mixing with the air in the IGU. Consequently, the IGU requires from about one to three minutes to be filled with the Argon, during which the IGU moves as much as about two meters along the travel path 22. The units 94, 94' are identical, as are their respective associated delivery systems 96, 96' so only the unit 94 and the delivery system 96 are described in detail.

The preferred gas source 92 comprises a tank of liquified Argon gas, a pressure reducing pressure regulator communicating with the tank, and a conduit for communicating Argon from the tank to the metering unit. The tank, regulator and conduit may be of any conventional or suitable construction and are therefore not illustrated in detail or described further.

The metering unit 94 is a commercially available unit known as a model no. RSGH-4 available from FDR Design, Inc. of Buffalo, Mn. The metering unit splits the Argon flow into four streams that are individually controllable by electrically operated valves in the unit. The valves are individually opened by a system attendant actuating respective switches of a remote hand-held controller 98. The metering unit 94 is constructed with oxygen sensors, each maintaining a respective Argon flow control valve open so long as air continues to be exhausted from an associated IGU. When the associated IGU is filled with Argon, air is no longer exhausted from it and the oxygen sensor reacts to close the Argon flow control valve and produce a signal indicating that the filling operation is complete. The valve remains closed until the Argon flow is reinitiated by the attendant. The gas exhausted from each IGU is communicated to the associated Oxygen sensor in the unit 94 via an Oxygen sensor conduit that extends to the IGU vent opening.

The delivery system 96 communicates the Argon flow from the metering unit 94 to the moving IGUs. A production line attendant manually connects the delivery system 96 to each of several IGUs and Argon is supplied to the respective IGUs as they move through the filling station 32. When the IGUs are filled, the attendant disconnects the delivery system. The preferred system 96 comprises Argon supply conduits 100 each communicating the metering unit 94 with a respective IGU, a conduit support assembly 102, and an IGU clamp 104 associated with each conduit for securing a conduit end in place with respect to the IGU (see FIGS. 3 and 6).

The preferred Argon supply conduits 100 are each formed from a length of gas impervious, flexible tube that communicates at one end with an associated Argon flow control valve in the metering unit 94 via a suitable fitting and at the opposite end with an IGU via a projecting nipple-like fitting 100*a* that projects into the IGU through the vent opening. In the preferred embodiment of the invention the conduits are color coded to correspond with respective color coded push buttons on the hand held controller 98. The attendant opens a control valve associated with a given conduit by pressing the corresponding push button.

Each conduit 100 is paired with an oxygen sensor conduit, indicated by the reference character 106 (FIG. 6), that extends between the associated IGU and a suitable fitting communicating with an associated Oxygen sensor in the metering unit 94. The sensor conduit end remote from the Oxygen sensor unit is disposed immediately adjacent the IGU vent opening. The Oxygen sensor is so constructed and arranged that air and/or Argon gas at the conduit end opening is drawn through the sensor conduit 106 to the Oxygen sensor intake.

In the preferred and illustrated embodiment of the invention the conduits 100, 106 are partially housed in a flexible tubular shroud 107. As illustrated, ends of the conduits 100, 106 project from the shroud for individual connection to the metering unit 94 while opposite ends of the conduits project for individual connection to IGUs on the conveyor. The shroud 107 facilitates the ability of the support unit 102 to support the conduits as a unit.

The illustrated conduit support assembly 102 comprises a support member 110 adjacent the conveyor and guide structure 112 supporting and guiding the member 110 along a path of travel that extends parallel and next to the conveyor from a location where the IGUs just emerge from the cooling station 30 to the sealing station 34. The support member 110 is secured to the shroud end nearest the conveyor and is freely movable along the guide structure. In the preferred embodiment of the invention the guide structure 112 comprises upper and lower tracks 112*a*, 112*b*. The support member 110 is formed by an elongated upright structural element having rollers (not shown) at its opposite ends that engage the guide structure tracks. The member 110 is maintained in a vertical orientation between the guide tracks. The upper guide track 112*a* is illustrated as fixed with respect to the ceiling of the enclosure 84. The lower guide track is mounted on the conveyor framework side frame nearest the machine production line attendant responsible for operating the filling station 32. The shroud 107 is attached to the support member 110 at a location that is elevated above the conveyor framework at or above the tops of the IGUs passing through the filling station. The conduits 100, 106 extend from the shroud end so that the conduit pairs can be connected to respective IGUs at the vent port locations near the upper corner of each IGU.

Figure 6:
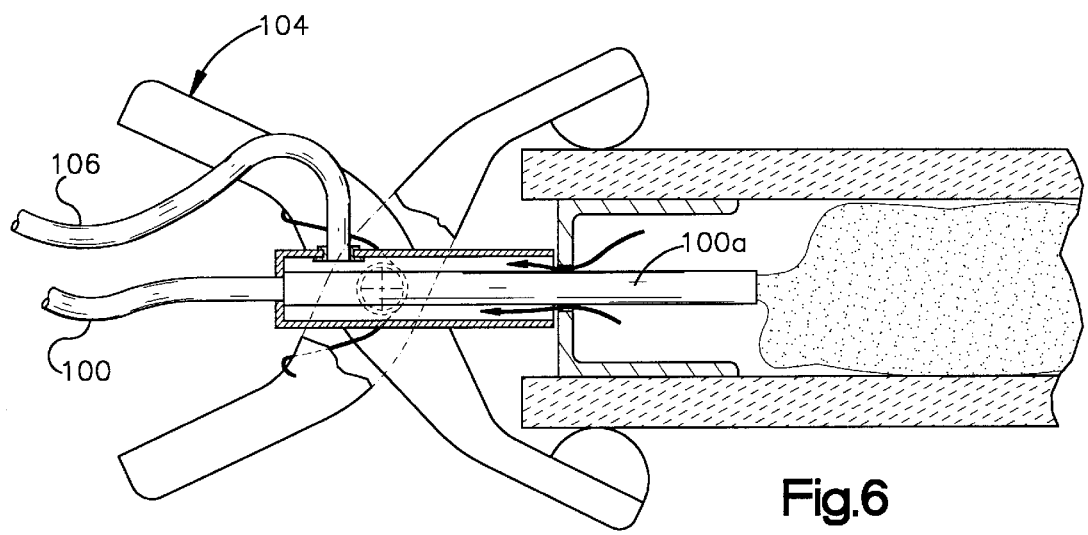
FIG. 6 is a view seen approximately from the plane indicated by the line 6—6 in FIG. 3.

Each IGU clamp 104 is mounted at the projecting ends of a pair of the conduits 100, 106 (see FIG. 6). The preferred clamps are "alligator" clamps in that they define clamp jaws that are spring urged to the closed positions and are manually opened by the production line attendant. An Argon supply conduit 100 is mounted on each clamp and oriented with respect to the clamp so that the clamp can be secured to the IGU with the conduit positioned so that it projects into the vent opening when the clamp is attached to the IGU. The Oxygen sensor conduit 106 is positioned relative to the clamp so that the conduit end opening is immediately adjacent the vent port when the clamp is attached to the IGU with the conduit 100 projecting into the vent opening.

As the IGUs move through the station 34, the support member 102 is pulled along the guide tracks 112*a*, 112*b* by the conduits so the filling process is uninterrupted. In the illustrated and preferred embodiment of the invention the shroud is "festooned" to the support assembly 102 in the sense that the shroud 107 is suspended from the upper guide structure track 112*a* by a series of suspension brackets that are attached to the shroud at spaced locations along its length and are freely movable along the guide track. The shrouded conduits are thus supported well above the conveyor where they can not become entangled with the production line machinery. The shrouded conduits are supported on the upper guide track like a shower curtain and can be extended from and retracted toward the metering unit 94.

The production line attendant attaches the IGU clamps to respective IGUs moving through the filling station with the conduits 100, 106 positioned as noted. The attendant then presses the appropriate push buttons on the controller 98 to initiate the Argon flow. When the IGUs are filled and the Oxygen sensor unit has signalled completion of the process, the attendant detaches the clamps from the filled IGUs, pushes the support member 102 back toward the metering unit 94, and connects the clamps to unfilled IGUs emerging from the cooling station.

The delivery system 96' is constructed the same as the system 96. The system 96 is located between the system 96' and the IGU travel path 22 so that the conduits 100', 106' pass through the plane of motion of the support member 102 when they are connected to IGUs. For this reason, the system 96' is positioned a short distance "downstream" from the system 96. The production line attendant connects the conduits 100', 106' to IGUs that are downstream from the IGUs that the conduits 100, 106 are connected to. Thus the conduits 100', 106' do not interfere with the member 102 and the conduits 102, 106 do not interfere with the member 102'.

Figure 7:
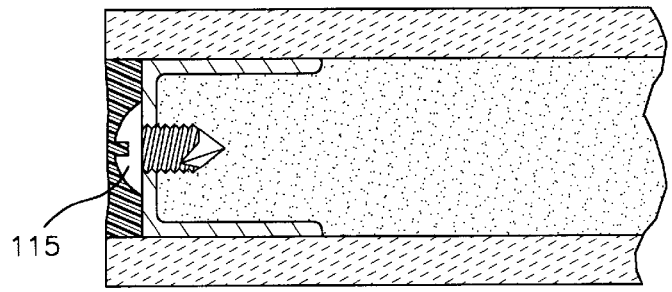
FIG. 7 is a view similar to FIG. 6 showing an part of an IGU in which the vent opening has been closed and sealed.

The filled IGUs are conveyed to the sealing station where an attendant closes and seals the vent opening. In the illustrated embodiment of the invention the vent openings are closed by a sheet metal screw 115 that is threaded into the vent opening to substantially close it. See FIG. 7. A hot melt adhesive material is then gunned onto the exterior of the IGU over the screw head to seal the juncture of the screw and vent opening against any gas leakage into, or out of, the IGU. In the preferred embodiment a pneumatic screw driver 116 (FIG. 1) is provided at the sealing station along with a supply of hot melt material, a hot melt pump, a heated flexible hose, and a hot melt gun, schematically indicated at 117, for applying the material. While a screw and hot melt material are used in the illustrated embodiment, any reliable method of hermetically closing the IGU may be employed.

After the IGUs are hermetically closed, they pass through the heat insulating curtain at the end of the enclosure and to the off-loading station 36. There, the completed IGUs are removed from the conveyor while in their upright positions and placed on a carrier so that they can be moved to a location where they are assembled into completed windows or doors.

Figure 9:
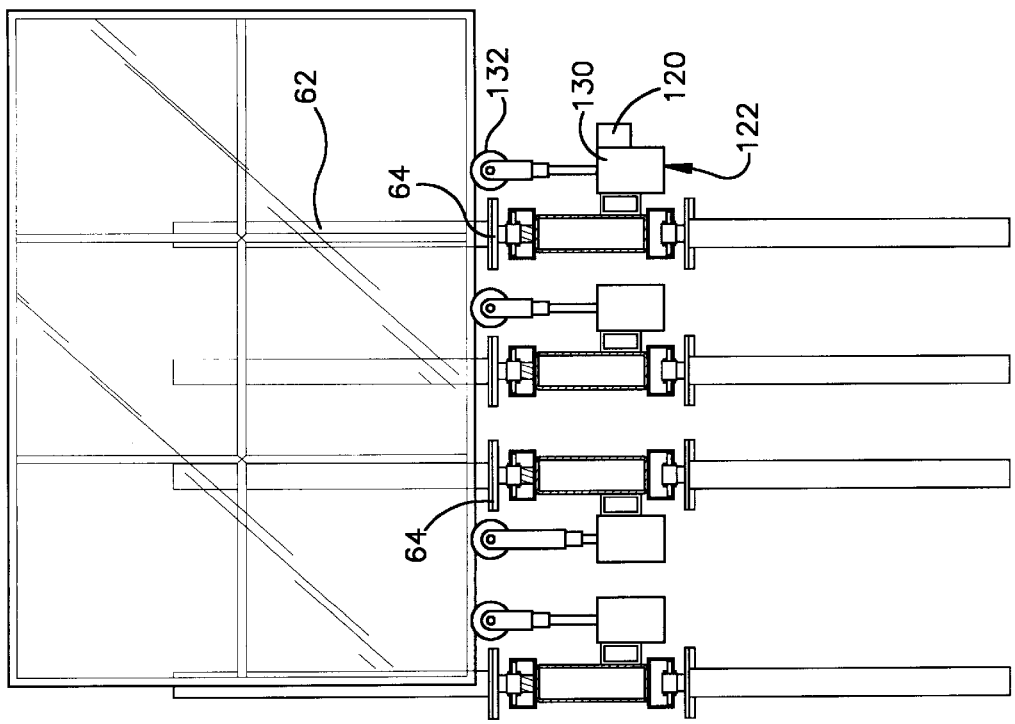
Figure 8:
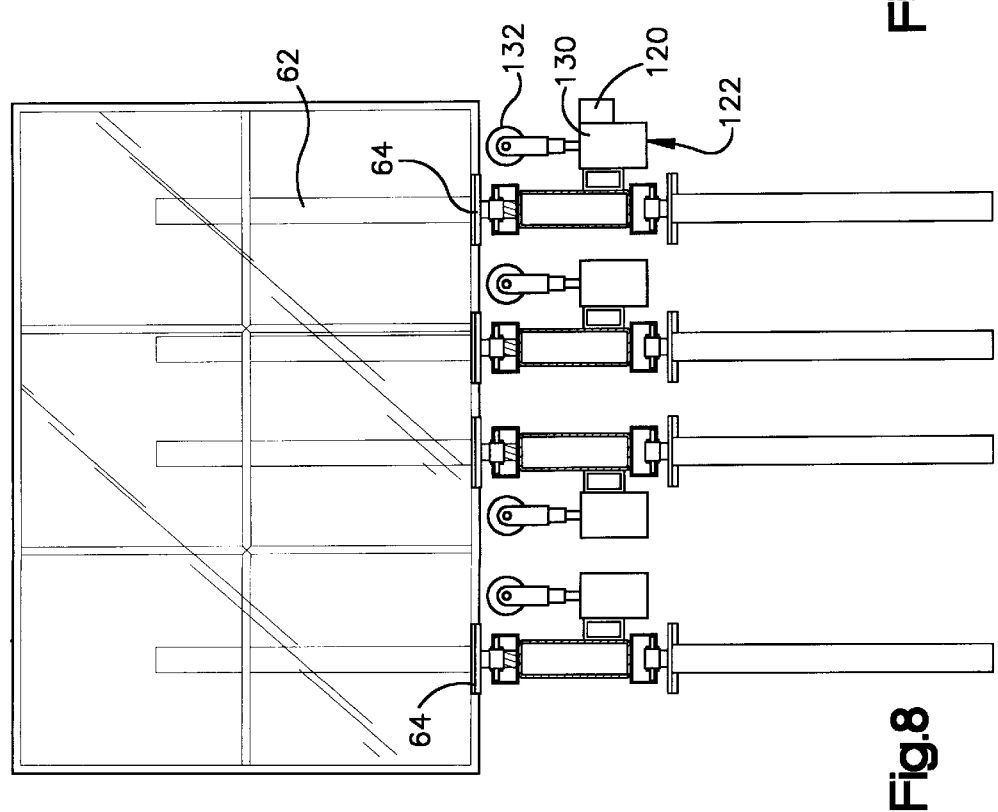
FIG. 8 is a view seen approximately from the plane indicated by the line 8—8 in FIG. 3; and, FIG. 9 is a view similar to FIG. 8 with parts shown in alternate positions.

Removing the IGUs is facilitated by an IGU position sensor unit 120 and "pop-up" roller units 122 that coact to permit production line attendant to shift the IGUs laterally from the conveyor 44 (see FIGS. 2, 8 and 9). The illustrated sensor unit 120 comprises a light sensitive element (at 120) stationed along the travel path at the off-loading station, and control circuitry (not illustrated) for stopping the motor 42 and operating the pop-up roller units 122 in response to an output signal from the light sensitive element. When an IGU reaches the sensor location, the sensor element detects it and produces an output signal to the control circuitry for deenergizing the motor 42 and activating the pop-up roller units.

The roller units 122 are arranged in a line extending transverse to the travel path 22 and aligned with the lower side of an IGU that has been sensed by the unit 120 and is stationary above the roller units 122. In the illustrated production line 10 four roller units are provided. Each roller unit 122 comprises a pneumatic ram and cylinder assembly 130 and a roller 132 supported for free rotation at the end of the ram. The ram and cylinder are mounted in a vertical orientation below the travel path 22. When the sensor unit 120 detects an IGU, valves controlling the units 122 are actuated so that the rams are extended upwardly. The rollers 132 engage the lower side of the IGU and lift it from the IGU edge supporting plates 64 (FIG. 9). Each roller is formed with a peripheral groove that is sufficiently wide to receive the widest IGU handled by the system 10 so the IGU is positively supported by the rollers.

A production line attendant at the off-loading station removes the IGU by shifting it laterally relative to the travel path 22. The rollers 132 rotate to permit IGU removal with little effort. As the IGU is rolled off the rollers, the attendant lifts the IGU and carries it to a storage location. When the IGU being removed clears the sensor unit 120 an output is produced that is effective to enable operation of the conveyor motor 42 and to enable retracting the rollers 132 to their initial positions.

In the unlikely event an IGU passes the sensor unit 120 without being removed from the conveyor, a protective sensor unit 136 stops the motor 42 before the IGU is dropped from the end of the conveyor. The sensor unit 136 preferably comprises a photosensitive element that produces an electrical output signal when an IGU is sensed adjacent the unit. The output signal is effective to stop the motor 42 until the IGU is no longer sensed.

While a single embodiment of the invention has been illustrated and described, the invention is not to be considered limited to the precise construction shown. Various modifications, adaptations, and uses of the invention may occur to those having ordinary skill in the business of constructing insulating glass units. The intention is to cover hereby all such modifications, adaptations and uses that fall within the scope or spirit of the appended claims.

What is claimed:

1. A method of manufacturing insulating glass units comprising:

delivering a succession of high temperature insulating glass units from an oven and a press;

moving successive insulating glass units along a travel path with the major surfaces of each insulating glass unit extending substantially parallel to the major surfaces of adjacent; establishing an insulating glass unit cooling station on said travel path;

moving the insulating glass units into heat exchange relationship with a fluent cooling medium at said cooling station comprising directing cooling medium between adjacent insulating glass units moving along said travel path to reduce the insulating glass unit temperature;

thereafter closing and sealing the vent opening of each insulating glass unit.

2. The method claimed in claim 1 further comprising introducing inert gas into insulating glass units emerging from said cooling station and moving along said travel path.

3. The method claimed in claim 2 wherein introducing inert gas includes providing a gas introducer, inserting the introducer into the vent opening of an insulating glass unit and moving the introducer with the insulating glass unit along the travel path.

4. The method claimed in claim 1 wherein moving successive insulating glass units along said travel path comprises orienting said insulating glass units with their major surfaces disposed in substantially vertical planes and successive insulating glass units disposed in closely spaced relation.

5. The method claimed in claim 4 wherein said cooling station comprises at least a blower for directing cooling medium onto insulating glass units moving through the cooling station.

6. The method claimed in claim 5 wherein said at least one blower directs cooling medium onto said insulating glass units in a direction parallel to said major surfaces.

7. The method claimed in claim 1 wherein the insulating glass units are discharged from the press with their major surfaces disposed in horizontal planes and further comprising the step of shifting successive insulating glass units to a position where the major surfaces are substantially vertical.

8. The method claimed in claim 7 further comprising the step of shifting successive insulating glass units to a position where the major surfaces are horizontal after they have exited the cooling station.

9. The method claimed in claim 8 wherein the step of shifting the insulating glass units to a position where the major surfaces are horizontal is performed after the insulating glass unit vent is closed and sealed.

\* \* \* \* \*